Figures 1, 2:
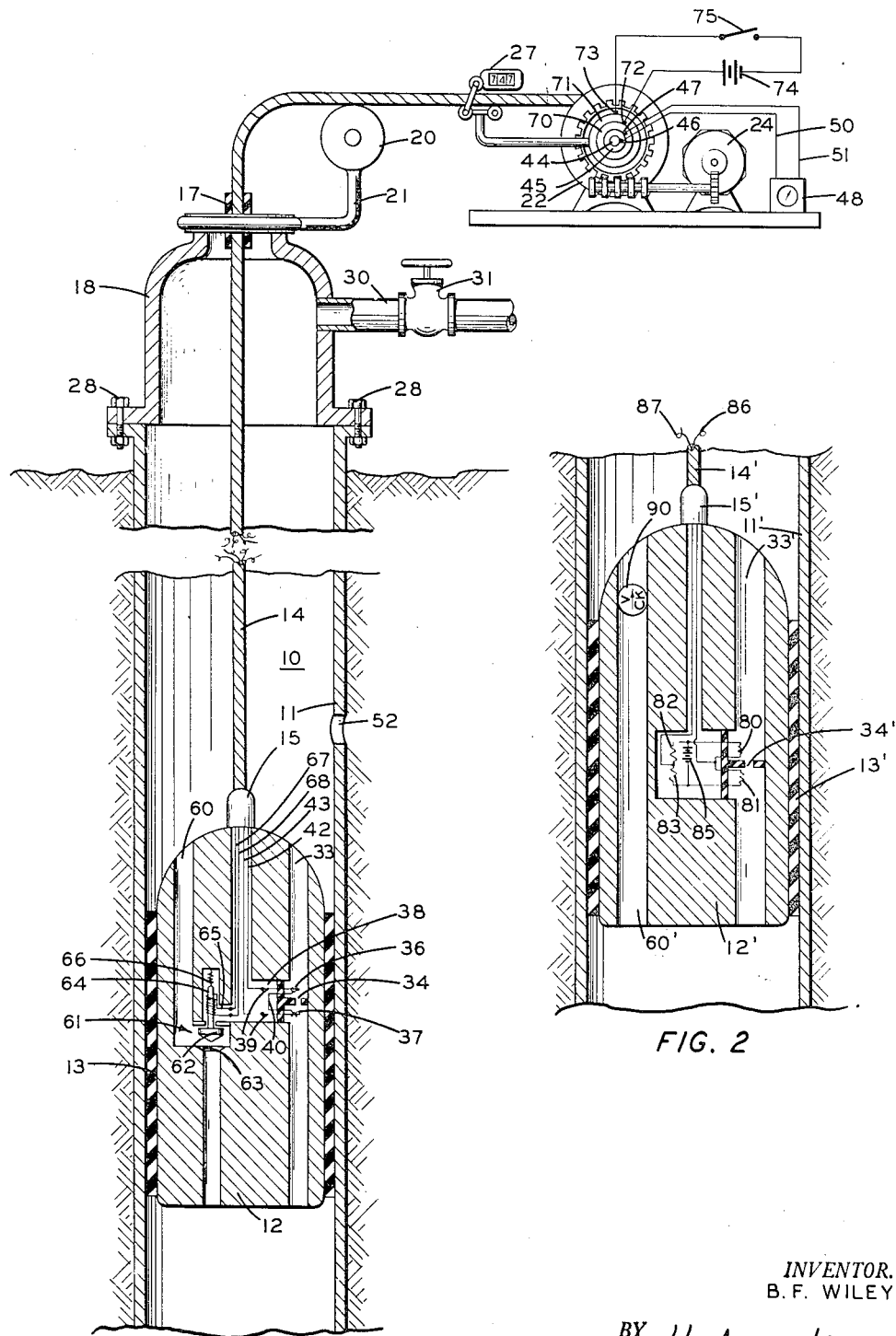

INVENTOR.
B. F. WILEY
BY Hudson & Young
ATTORNEYS

United States Patent Office 2,731,826
Patented Jan. 24, 1956

2,731,826

APPARATUS FOR DETECTING LEAKS IN GAS WELLS

Bruce F. Wiley, Bartlesville, Okla., assignor to Phillips Petroleum Company, a corporation of Delaware Application October 30, 1951, Serial No. 253,937

11 Claims. (Cl. 73—40.5)

This invention relates to apparatus for locating leaks in casings of gas wells.

In gas producing wells, leaks often develop in the casing that forms the flow path from the subterranean gas deposit to the surface. Such leaks can be caused by a number of factors such as corrosion, faulty fitting of the coupling threads, electrolytic action, and erosion. It is of course apparent that considerable difficulty is encountered in attempting to locate the position of a leak or of a plurality of leaks without removing the entire casing from the bore hole. The removal of the casing from the well, moreover, is no simple task since a derrick and other heavy hoisting equipment must be employed thereby resulting in a costly and time consuming operation. For this reason there exists a definite need for a simple and rapid method of locating the position of leaks in gas well casings. While several procedures have been advanced for this purpose in the prior art, most of equipment employed is somewhat complicated and leaves much to be desired from the viewpoint of providing a rapid leak testing device.

It is toward providing a simple and direct apparatus for locating the position of leaks in well casings that the present invention primarily is directed. In this regard there is described a novel apparatus for locating the position of said leaks which relies upon a measurement of the temperature differential created across an orifice when a gas expands therethrough, this phenomenon being known as the Joule-Thomson effect. A piston-like element having a small passage therethrough is lowered into the gas well to be tested, and the temperature differential across a small orifice within said passage is observed. As long as the piston-like element remains above the leak there is no gas flow upward through the opening and out at the surface since the surface opening of the casing previously is sealed to prevent gas flow therefrom. However, once the measuring element is lowered below the leak there is a gas flow upward through the passage in said element and out of the well through the leak. Thus, by observing the temperature differential across the opening at various positions in the well, the location of the leak is at once apparent, this location being determined by the distance the element has been lowered into the well at the time the temperature differential is noted.

Accordingly, it is an object of this invention to provide improved apparatus for locating the position of leaks in gas wells which does not necessitate removing the casing from the well.

Another object is to provide apparatus for locating the position of leaks in gas wells which is simple to construct, easy to operate, and which gives rapid, reliable readings.

Various other objects, advantages, and features of this invention should become apparent to those skilled in the art from the following detailed description of a preferred embodiment thereof taken in conjunction with the accompanying drawings in which:

Figure 1 is a schematic longitudinal view, shown partially in section, of a well casing together with leak detecting apparatus positioned therein; and Figure 2 illustrates a second form of leak detecting apparatus.

Referring now to the drawing in detail and to Figure 1 in particular there is illustrated a gas well 10 having a casing wall 11 defining the flow path from the gas deposit to the surface of said well. Within casing 11 there is positioned a piston element 12 adapted for longitudinal movement therein, and which makes sealable contact with casing 11 by means of a sealing device such as rubber gasket 13 positioned between piston 12 and casing 11. Piston 12 is suspended within the bore hole by means of a cable 14 secured thereto by collar 15. At the surface of the well cable 14 is inserted within the casing through a packing gland 17 located axially in casing head 18. Cable 14 passes from the top of the well over a guide wheel 20 which is supported by a bracket 21 attached to the top portion of casing head 18. The upper end of cable 14 is fastened to a motivated reel 22 which is revolved to raise and lower piston 12 in the well by means of a prime mover 24, which preferably can be either an internal combustion engine or an electric motor. The length of cable 14 suspended within the well is measured by mechanism such as a three-point odometer 27 through which cable 14 is directed. Casing head 18 is secured to casing 11 by bolts such as 28 to enable the upper section to be readily removed for insertion of piston 12. A gas outlet pipe 30 having a valve 31 therein, which is closed during leak testing operations, forms an integral part of casing head 18.

Within piston 12 there is formed a first small longitudinal passage 33 which is further restricted by a narrow orifice 34 through which any gas that flows past piston 12 is directed. Adjacent orifice 34, and on either side thereof, are positioned opposite junctions 36 and 37 of a thermocouple unit formed of dissimilar metallic wires 39 and 40, which can be copper and constantan, for example. Wires 39, in turn, are connected to suitable conducting leads 42 and 43 which pass through chamber 38 in piston 12 and through cable 14 to the surface of the well. The upper ends of leads 42 and 43 are connected to slip rings 44 and 45, respectively, mounted on reel 22. Brushes 46 and 47 make electrical contact with slip rings 44 and 45, respectively; and any potential difference therebetween is indicated by a suitable current indicating device such as galvanometer 48 connected between said brushes by leads 50 and 51.

A second longitudinal passage 60 also is formed within piston 12. A solenoid operated valve 61 is located within passage 60 and serves to control the flow of gas therethrough as desired. Valve 61 comprises a plunger head 62 for making sealable contact with valve seat 63. Attached to plunger head 62 is a rod 64, the upper end of which is constructed of magnetic material, the lower end of said rod being enclosed within solenoid coil 65. Valve 61 normally is maintained in an open position by means of tension spring 66. Coil 65 is connected by electrical leads 67 and 68, which pass through cable 14, to suitable slip rings 70 and 71, respectively, mounted on reel 22. Brushes 72 and 73 connect slip rings 70 and 71, respectively, in circuit with battery 74 and switch 75. Closure of switch 75 thus actuates coil 65 to close valve 61.

Assuming that a leak has developed at some unknown position in casing 11 through a crack such as indicated at 52, the operation of the above described testing equipment to determine the depth of leak 52 is as follows. Casing head 18 first is removed from casing 11 to allow piston 12 to be inserted within the bore hole; casing head 18 then is replaced and valve 31 closed to shut in the well. Following this, piston 12 is lowered slowly down into the well by operation of prime mover 24 which rotates reel 22 to let out cable 14. At various spaced depths in the well reel 22 is stopped, valve 61 is closed, and any deflection of galvanometer 49 is observed. As long as piston 12 remains above leak 52 there is a null reading on galvanometer 49 because there is no flow of gas upward past orifice 34. However, once piston 12 is lowered below the depth of leak 52 there is a gas flow upward past orifice 34 and out the well through leak 52. This gas flow is indicated by the resulting galvanometer deflection which is indicative of the temperature differential created across orifice 34 by the expansion of gas passing therethrough. Once piston 12 has been lowered below leak 52 a series of readings are taken both above and below said leak in order to locate its exact depth by a bracketing process.

In some instances it may be necessary to wait a short time after valve 61 is closed to allow for excess gas constrained within casing 11 above leak 52 to pass out through said leak thereby lowering the pressure within said upper portion of casing 11. The galvanometer reading can then be observed. A second method of locating leak 52 which is effective if leak 52 is large and/or the gas pressure is relatively high is to initially lower piston 12 to a point below the leak and then slowly raise said piston upward past said leak with valve 61 closed. Once the depth of leak 52 is reached there is a sudden change in galvanometer deflection because there no longer is a gas flow upward through the well, and hence upward past orifice 34. Still a third method of operation is to close valve 61 and lower piston 12 slowly down into the well. At the depth of leak 52 there is again a sudden change in galvanometer deflection since there is a continuous flow upward through the well and out leak 52 at all times.

In Figure 2 there is illustrated a second embodiment of the temperature sensing apparatus positioned within piston 12. The apparatus shown in Figure 2 is essentially the same as that of Figure 1, and like parts are designated by like primed reference numerals. In place of the thermocouple junctions disposed on either side of the orifice 34 in Figure 1, temperature sensitive resistance elements 80 and 81 forming adjacent arms of a Wheatstone bridge circuit are employed in Figure 2. Resistors 82 and 83 form the balancing arms of the bridge circuit across which is applied a source of potential 85. Any unbalance of the bridge circuit created by the cooling effect on element 80 due to expansion of gas through orifice 34' creates a difference in potential between leads 86 and 87 which connect the bridge circuit with galvanometer 48 at the surface of the well. Disposed within passage 60' is a check valve 90 which is adapted to permit flow of gas through passage 60' as piston 12' is lowered into the well, the large pressure created by the lowering of said piston 12' being sufficient to open valve 90.

From the foregoing description it should be apparent that the objects of this invention have been accomplished by means of simplified temperature sensing apparatus which can be lowered into gas wells to measure the flow of gas therepast at different levels. While this gas flow detecting apparatus has been described in conjunction with a method of testing gas wells for the presence of leaks therein, the possible applications of such apparatus are in no way limited exclusively thereto. For example, it is possible to measure flow rates of gases in general by directing said gases through an orifice and measuring the temperature differential created thereacross. Through suitable calibration of the resulting temperature differential there is obtained a simplified form of flowmeter.

While this invention has been described in conjunction with present preferred embodiments thereof, it should be apparent to those skilled in the art that various modifications can be made without departing from the scope of said invention.

I claim:

1. Apparatus for detecting the presence of a leak in a gas well comprising, in combination, a member adapted to be lowered into a gas well, means secured to said member and extending outward therefrom to make sealable sliding contact with the interior wall of a gas well when said member is lowered therein, said member having an orifice therein through which gas can flow between regions in said well on opposite sides of said member, and temperature sensing means positioned on each side of said orifice to detect flow of gas therethrough.

2. Apparatus for detecting the presence of a leak in a gas well comprising, in combination, a member adapted to be lowered into a gas well, means secured to said member and extending outward therefrom to make sealable sliding contact with the interior wall of a gas well when said member is lowered therein, said member having an orifice therein through which gas can flow between regions in said well on opposite sides of said member, and a thermocouple having its opposite junctions positioned on opposite sides of said orifice respectively to detect flow of gas therethrough.

3. Apparatus for detecting the presence of a leak in a gas well comprising, in combination, a member adapted to be lowered into a gas well, means secured to said member and extending outward therefrom to make sealable sliding contact with the interior wall of a gas well when said member is lowered therein, said member having an orifice therein through which gas can flow between regions in said well on opposite sides of said member, and an electrical bridge sensing element having opposing temperature sensitive resistance arms positioned on opposite sides of said orifice respectively to detect flow of gas therethrough.

4. Apparatus for determining the location of a leak in a gas well comprising, in combination, a member adapted to be lowered into a gas well, means secured to said member and extending outward therefrom to make sealable sliding contact with the interior wall of a gas well when said member is lowered therein, said member having an orifice therein through which gas can flow, temperature sensing means positioned on each side of said orifice, means for suspending said member within said well, means for indicating the depth said member is suspended within said well, and means for indicating at the surface of said well the temperature differential across said orifice.

5. The combination in accordance with claim 4 further comprising, a second passage formed in said member, valved means in said second passage, and means for selectively opening and closing said valved means.

6. Apparatus for determining the location of a leak in a gas well, comprising in combination, a weighted piston adapted for suspension within a gas well, said piston having a vertical passage therethrough, said passage having an orifice therein to restrict the flow of gas through said passage, temperature sensing means positioned on each side of said orifice, said temperature sensing means being adapted to provide electrical signals representative of the measured temperatures, a cable for suspending said piston within said well, said cable containing electrical leads for transmitting the temperature signals to the surface of said well, a sealing device positioned between said piston and the walls of the well whereby a fluid-tight connection is made between said piston and the walls of the well, means for indicating the length of cable suspended within the well, and means positioned at the surface of said well for indicating said electrical temperature signals.

7. The combination in accordance with claim 6 wherein said temperature sensing elements comprise opposite junctions of a thermocouple.

8. The combination in accordance with claim 6 wherein said temperature sensing elements comprise temperature sensitive resistance arms of an electrical bridge circuit.

9. The combination in accordance with claim 6, further comprising, a second vertical passage formed in said piston, an electrically operated valve disposed in said second passage, a source of electrical current positioned at the surface of said well, and electrical leads disposed in said cable for connecting said valve with said current source.

10. The combination in accordance with claim 6 further comprising, a second vertical passage formed in said piston, and a check valve disposed in said second passage, said check valve being adapted to open when a preselected pressure differential is applied thereacross and to close when said pressure differential falls to a second preselected value.

11. Apparatus for determining the location of a leak in a gas well comprising, in combination, a member adapted to be lowered into a well, said member having a passage therethrough, said member being of such configuration as to make sealable sliding contact with the wall of the well when lowered therein, said passage including an orifice, temperature sensing means positioned on each side of said passage, means for suspending said member within a well, means for indicating the depth said member is suspended, and means for indicating the temperature differential across said passage.

References Cited in the file of this patent

UNITED STATES PATENTS

| | | |
|---|---|---|
| 2,038,511 | Kortlandt | Apr. 21, 1936 |
| 2,365,794 | Armentrout et al. | Dec. 26, 1944 |
| 2,377,501 | Kinley | June 5, 1945 |
| 2,517,603 | Silverman | Aug. 8, 1950 |
| 2,545,102 | Miller | Mar. 13, 1951 |
| 2,580,182 | Morgan et al. | Dec. 25, 1951 |
| 2,654,433 | Piety | Oct. 6, 1953 |